Nov. 6, 1962    B. McDONALD    3,062,662
CONFECTION
Filed March 13, 1958
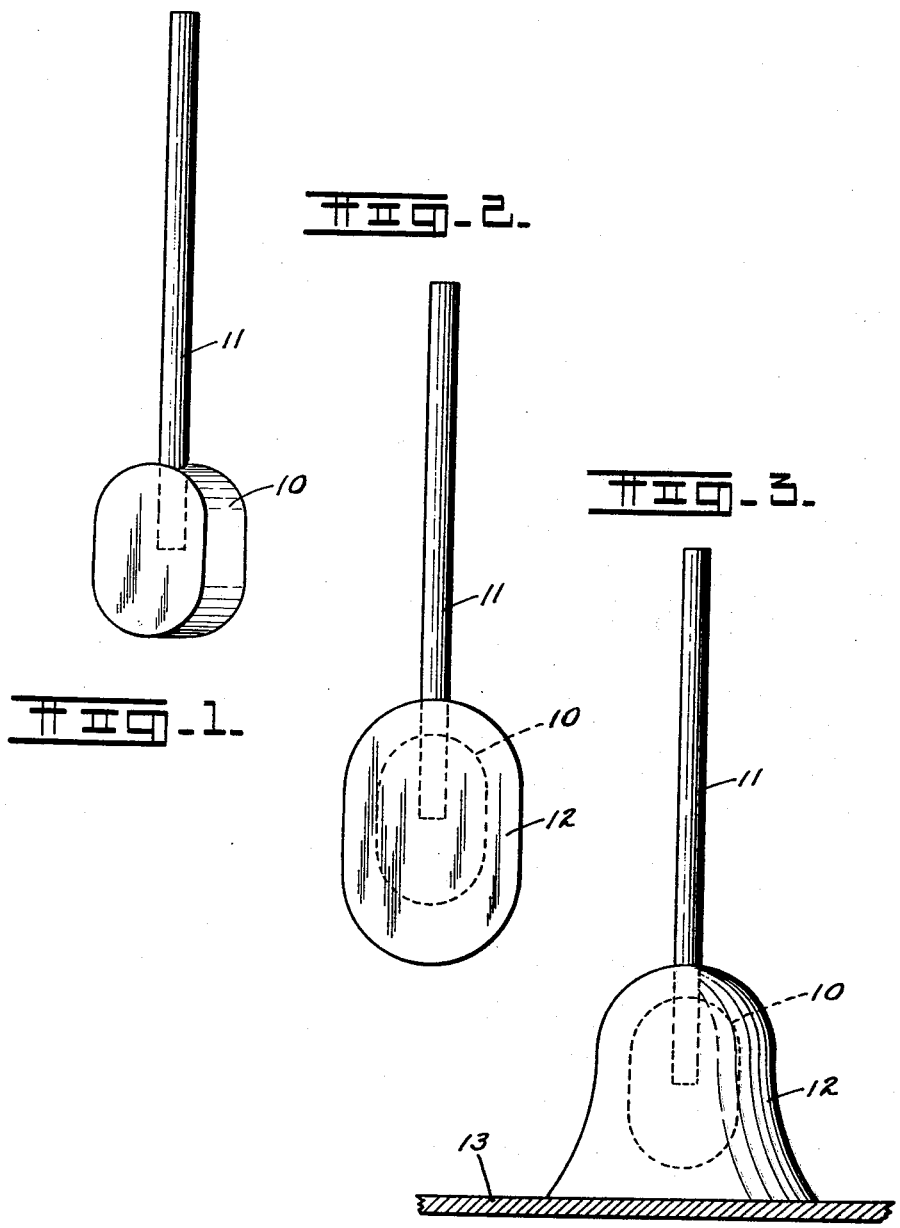
INVENTOR.
Bessie McDonald.
BY
W. B. Harpman
ATTORNEY.

3,062,662
CONFECTION
Bessie McDonald, 3929 5th St., Struthers, Ohio
Filed Mar. 13, 1958, Ser. No. 721,116
2 Claims. (Cl. 99—138)

This invention relates to a confection and more particularly to a combination bubble gum and candy sucker.

The principal object of the invention is the provision of a novel confection resulting from the substantial intermixing of a sugar base candy and a portion of bubble gum.

A further object of the invention is the provision of a bubble gum and candy sucker and method of making the same.

A further object of the invention is the provision of an inexpensive, attractive confection capable of being both eaten and chewed.

A still further object of the invention is the provision of a confection incorporating a combination of gum base material, a sweetening material therefor, and a rubber-like material capable of forming a resilient film and intermixed with and enclosed in a coating of edible candy and mounted on a sucker stick.

The bubble gum sucker disclosed herein comprises an improvement in the confectioner's art in that it provides a sucker incorporating a combination of two attractive ingredients in an attractive form. It is well known that children prefer confections in the form of suckers and it is also well known that many and various types of suckers have been heretofore produced from various candies all of which are edible.

The novelty in the present disclosure relates to incorporating flavored bubble gum material in a flavored candy composition so that the candy composition intermixes with a substantial part of the bubble gum material. The intermixing occurs while the candy is a heated liquid, saturating the bubble gum material, and forms hardened brittle crystals and areas in and on the bubble gum material when cooled so that a crunchy characteristic results.

The different flavor and texture of the hard candy intermixed with the bubble gum completely alters the taste and feel of the bubble gum and/or candy and masks the rubber taste usually associated with the bubble gum. Additionally, the candy dissolves out of the gum material very slowly so that a slow release of the flavor and sweetness occurs which is highly desirable.

With the foregoing and other objects in view which will appear as the description proceeds, the invention resides in the combination of ingredients and the arrangement of portions of those ingredients and in the method of assembly of the ingredients as hereinafter described and claimed, it being the intention to cover all changes and modifications of the example of the invention herein chosen for purposes of the disclosure, which do not constitute departures from the spirit and scope of the invention.

The invention is illustrated in the accompanying drawing wherein:

FIGURE 1 is a perspective view of a portion of the chewing gum sucker in its initial form.

FIGURE 2 is a side elevation of the chewing gum sucker, during the process of its formation.

FIGURE 3 is a side elevation of the chewing gum sucker in its finished form.

By referring to the drawing and the FIGURE 1 thereof, it will be observed that the chewing gum sucker comprises initially an appropriately shaped piece of bubble gum 10, impaled upon a sucker stick 11, it being observed that the piece of bubble gum 10 is composed of a suitable gum base material, including a sweetening material, a flavor and a material such as latex rubber or the like characterized by its ability to form a resilient film or bubble. Such bubble gum is known in the confectioner's art and is available from several commercial sources. Such bubble gum is solid at room temperatures and has a tendency to melt at higher temperatures.

In FIGURE 2 of the drawings the bubble gum sucker is shown in its intermediate stage of preparation and wherein the bubble gum 10 and stick 11 have been dipped in a suitable candy 12 as hereinafter described.

The candy 12 preferably comprises a candy of suitable consistency as for example that formed by the following ingredients and method. To twenty pounds of granulated cane sugar, five pounds of white corn syrup is added together with enough water to dissolve. The material is then cooked until a minimum temperature of 300° F. is achieved, the maximum temperature being approximately 310° F. Upon reaching said temperature the candy material will comprise a hot syrup. A desirable food color is then added together with a desirable flavor. The food color is preferably one matching the particular flavor employed. The syrup is allowed to cool slightly and is then ready for the dipping of the impaled bubble gum 10 as heretofore described.

Flavors and colors that may be added include anise or cherry flavor with a red color, wintergreen flavor with a green color, lemon flavor with a yellow color, orange flavor with an orange color, salt and butter with a butterscotch color, such as light caramel. Chocolate and/or cocoa will flavor and appropriately color the candy, and rootbeer flavor and others known in the art may be added together with appropriate coloring material as known in the art.

The quantity of flavoring material added to the foregoing specified ingredients is approximately four ounces of a flavor such as vanilla and comparable quantities of the various flavoring oils specified.

In forming the desired shape of the chewing gum sucker the impaled bubble gum 11 is dipped once or twice in the syrup and the dipped product is positioned on a flat surface such as indicated by numeral 13 in FIGURE 3 of the drawing with the sucker stick 11 standing vertically thereabove and with the piece of bubble gum 10 disposed in the approximate center of the candy coating 12. Such positioning results in the flowing of some of the candy 12 into a bell shape as illustrated in FIGURE 3, which is a particularly desirable shape for the confection as it enables the same to be advantageously displayed for sale, and additionally positions the sucker sticks free of the confection. After the confection has cooled and solidified it is removed from the flat forming surface 13 and packaged as desired.

In carrying out the foregoing method of forming the confection it is necessary to dip the bubble gum into the hot candy syrup sufficiently so that the bubble gum will partially melt and soften and mix with the candy. The dipping temperature may vary with the consistency and composition of the bubble gum employed, and should be determined by test. It will occur to those skilled in the art that the candy syrup will be substantially clear and transparent without the coloring and/or flavoring, and that when the lighter colors are imparted thereto several dippings of the product in such light colored candy syrup may be necessary to form a suitable coating over the intermixed confection.

It will thus be seen that a novel confection has been disclosed which is particularly attractive both to the eye and to the taste, and which is capable of inexpensive formation with a minimum of equipment, and which therefore meets the several objects of the invention.

Having thus described my invention what I claim is:

1. A bubble gum sucker comprising a central portion of gum base material impregnated by crystals of hard candy for giving a crunchy characteristic thereto, and a purse candy substance completely surrounding said central portion, and support means for mounting said sucker thereon produced by the method of claim 2.

2. The method of preparing a bubble gum sucker comprising taking a core of bubble gum impaled on a stack, dipping the core into a hard candy substance liquefied at a high temperature of at least 300° F. for a sufficient time to impregnate said core with candy substance, thereafter cooling said core and candy substance to form suckers having a central core of gum material impregnated with hard candy crystals and a covering of pure candy.

References Cited in the file of this patent

UNITED STATES PATENTS

| | | |
|---|---|---|
| 1,618,324 | Burt | Feb. 22, 1927 |
| 1,718,997 | Burt | July 2, 1927 |
| 1,786,606 | Gordon | Dec. 20, 1930 |
| 2,460,698 | Lindhe | Feb. 1, 1949 |

OTHER REFERENCES

"International Confectioner," vol. 64, No. 6, June 1954, p. 37.